US010055660B1

(12) United States Patent
Mahmoud et al.

(10) Patent No.: US 10,055,660 B1
(45) Date of Patent: *Aug. 21, 2018

(54) ARABIC HANDWRITING RECOGNITION UTILIZING BAG OF FEATURES REPRESENTATION

(71) Applicant: KING FAHD UNIVERSITY OF PETROLEUM AND MINERALS, Dhahran (SA)

(72) Inventors: Sabri A. Mahmoud, Dhahran (SA); Mohammed O. Assayony, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 15/917,325

(22) Filed: Mar. 9, 2018

Related U.S. Application Data

(63) Continuation of application No. 15/708,485, filed on Sep. 19, 2017.

(51) Int. Cl.
  *G06K 9/00* (2006.01)
  *G06T 7/11* (2017.01)
  *G06K 9/46* (2006.01)
  *G06F 17/24* (2006.01)

(52) U.S. Cl.
  CPC ....... *G06K 9/00879* (2013.01); *G06F 17/243* (2013.01); *G06K 9/4676* (2013.01); *G06T 7/11* (2017.01)

(58) Field of Classification Search
  CPC .......... G06K 9/00879; G06K 9/00859; G06K 9/4676
  See application file for complete search history.

(56) References Cited

U.S. PATENT DOCUMENTS

| 8,380,492 B2 | 2/2013 | Xu |
| 9,582,727 B2 * | 2/2017 | Abdollahian ............. G06T 3/60 |
| 2010/0008581 A1 | 1/2010 | Bressan |
| 2010/0067793 A1 | 3/2010 | Serrano et al. |
| 2010/0128985 A1 | 5/2010 | El-Sana et al. |
| 2010/0310172 A1 * | 12/2010 | Natarajan .......... G06K 9/00865 382/187 |

(Continued)

OTHER PUBLICATIONS

Mandi Hamdani, et al., "Combining Multiple HMMs Using On-line and Off-line Features for Off-line Arabic Handwriting Recognition", $10^{TH}$ International Conference on Document Analysis and Recognition, Oct. 2, 2009, pp. 201-205.

(Continued)

*Primary Examiner* — Phuoc Tran
(74) *Attorney, Agent, or Firm* — Oblon, McClelland, Maier & Neustadt, L.L.P.

(57) ABSTRACT

A system, a non-transitory computer readable medium, and a method for Arabic handwriting recognition are provided. The method includes acquiring an input image representative of a handwritten Arabic text from a user, partitioning the input image into a plurality of regions, determining a bag of features representation for each region of the plurality of regions, modeling each region independently by multi stream discrete Hidden Markov Model (HMM), and identifying a text based on the HMM models.

10 Claims, 12 Drawing Sheets

(56) References Cited

U.S. PATENT DOCUMENTS

2013/0060786 A1  3/2013  Serrano et al.
2014/0156567 A1  3/2014  Scholtes

OTHER PUBLICATIONS

Mandi Hamdani, et al., "Unsupervised Selection of HMMs Architectures for Handwritten Text/Word Recognition", ISCIII, $5^{TH}$ International Symposium on Computational Intelligence and Intelligent Informatics, Sep. 15-17, 2001, pp. 19-24.

* cited by examiner

ARABIC HANDWRITING RECOGNITION UTILIZING BAG OF FEATURES REPRESENTATION

CROSS-REFERENCE TO RELATED APPLICATIONS

The present application is a Continuation of Ser. No. 15/708,485, having a filing date of Sep. 19, 2017.

BACKGROUND

Arabic script is written from right to left, in unicase, and in a cursive style. The Arabic script includes 28 basic letters, and several additional special letters. Recognition of handwritten cursive script, such as the Arabic script, may be difficult.

Scale invariant feature transform (SIFT) is an algorithm to detect and describe local features in images as described in U.S. Pat. No. 6,711,293 entitled "METHOD AND APPARATUS FOR IDENTIFYING SCALE INVARIANT FEATURES IN AN IMAGE AND USE OF SAME FOR LOCATING AN OBJECT IN AN IMAGE". Speed-Up Robust features (SURF) descriptor is a modified version of SIFT where Haar wavelet responses are computed efficiently using integral images as an approximation to the gradient magnitude and orientation, see Bay, H., Ess, A., Tuytelaars, T., and Gool, L., 2008, "Speeded-Up Robust Features," Computer Vision and Image Understanding 110 (3), 346-59. A center symmetric local binary pattern (CS-LBP) descriptor has been used to replace the gradient information by the response of the LBP in a computationally efficient manner as described in Heikkilä, M., Pietikäinen, M., and Schmid, C., 2009, "Description of Interest Regions with Local Binary Patterns," Pattern Recognition, 42 (3), 425-36. In the same manner the center symmetric local ternary pattern (CS-LTP) and weighted orthogonal symmetric local ternary pattern (WOS-LTP) descriptors both use the response of the extended LBP operator named Local Ternary Pattern (LTP) as described in Gupta, R., Patil, H., and Mittal, A., 2010, "Robust Order-Based Methods for Feature Description," in 2010 IEEE Computer Society Conference on Computer Vision and Pattern Recognition, 334-41, New York, USA, and Huang, M., Mu, Z., Zeng, H., and Huang, S., 2015, "Local Image Region Description Using Orthogonal Symmetric Local Ternary Pattern," Pattern Recognition Letters 54 (March), 56-62. It is worthy to note that the LBP and its extension LTP are closely related to the gradient as these operators essentially evaluate pixel intensity differences. Instead of continuing in evaluating the gradient magnitude and orientation values, the sign of the differences is used. To cope with the large dimensionality of the SIFT descriptor vector, several approaches were proposed. One of the earliest approaches is the principle component analysis (PCA-SIFT) that achieved the discrimination power of SIFT with descriptors of 20 to 36 elements by applying PCA on the gradient magnitudes as described in Yan, K., and Sukthankar, R., 2004, "PCA-SIFT: A More Distinctive Representation for Local Image Descriptors," In Proceedings of the 2004 IEEE Computer Society Conference on Computer Vision and Pattern Recognition (CVPR 2004), 2:506-13, Washington, D.C., USA. The SURF algorithm produces a descriptor of 64 elements by computing 4 bins in each of the 16 regions, instead of the 8 bins used in SIFT.

Computing SIFT descriptors for overlapped cells is equivalent to the dense sampling strategy applied frequently in computing Bag of Features (BoF) representations as described in Nowak, E., Jurie, F., and Triggs, B., 2006, "Sampling Strategies for Bag-of-Features Image Classification," In Computer Vision—ECCV 2006, Springer, Berlin, Heidelberg. The extraction of multi-scale descriptors in dense sampling is described in Bosch, A., Zisserman, A., and Munoz, X., 2007, "Image Classification Using Random Forests and Ferns," in IEEE 11th International Conference on Computer Vision, 1-8, Rio de Janeiro, Brazil, IEEE, Chatfield, K., Lempitsky, V., Vedaldi, A., and Zisserman, A., 2011, "The Devil Is In The Details: An Evaluation of Recent Feature Encoding Methods," in The 22nd British Machine Vision Conference, 1-12, and Dundee, R., Aldavert, M., Toledo, R., and Lladós, J., 2011, "Browsing Heterogeneous Document Collections by a Segmentation-Free Word Spotting Method," in 11th International Conference on Document Analysis and Recognition (ICDAR 2011), 63-67 and Aldavert, D., Rusiñol, M., Toledo, R., and Lladós, J., 2015, "A Study of Bag-of-Visual-Words Representations for Handwritten Keyword Spotting," International Journal on Document Analysis and Recognition (IJDAR) 18 (3), Springer Berlin Heidelberg: 223-34, as the multi-scale descriptors provide scale invariance.

Multi-stream Hidden Markov Models (HMMs) have been utilized to develop offline handwriting recognition systems as described in Kessentini, Y., Paquet, T., and Ben Hamadou, A., 2010, "Off-Line Handwritten Word Recognition Using Multi-Stream Hidden Markov Models," Pattern Recognition Letters 31 (1), Elsevier B. V., 60-70, Ahmad, I., Fink, G., and Mahmoud, S., 2014, "Improvements in Sub-Character HMM Model Based Arabic Text Recognition," in 14th International Conference on Frontiers in Handwriting Recognition, 537-42. Crete, Greece, and Jayech, K., Mahjoub, M., and Ben Amara, N., 2016, "Synchronous Multi-Stream Hidden Markov Model for Offline Arabic Handwriting Recognition Without Explicit Segmentation," Neurocomputing 214 (November): 958-71. However, it is noteworthy that these systems assume that the window observation is coming from independent feature streams, where each stream produces features for the entire window. The features of each stream are modeled independently in the HMMs.

The Bayesian-HMM (BHMM)-based handwritten text recognition system was first described in Giménez, A., and Juan, A., 2009, "Bernoulli HMMs at Subword Level for Handwritten Word Recognition," In Pattern Recognition and Image Analysis, 497-504, Springer Berlin Heidelberg. The state emission probability is modeled by a single multivariate Bernoulli probability density function. The text images are scaled to 30 pixels height while maintaining the aspect ratio and then converted to binary images using Otsu threshold method described in Otsu, Ni., 1979, "A Threshold Selection Method from Gray-Level Histograms," IEEE Transactions on Systems, Man, and Cybernetics 9 (1): 62-66. The columns of the binary images are taken as the observations. The system is evaluated on isolated English words extracted from IAM database as described in Marti, U.-V., and Horst Bunke, 2002, "The IAM-Database: An English Sentence Database for Offline Handwriting Recognition," International Journal on Document Analysis and Recognition 5 (1): 39-46. A character recognition error rate of 44.00% was reported by using BHMMs of 10 states. For the sake of comparison, the same database was used to evaluate a traditional HMM-based handwriting recognition system with single multivariate Gaussian probability densities and real-valued observations. A character recognition error rate of 64.20% was reported by using HMMs of 8 states. The single multivariate Bernoulli probability density may be replaced by multivariate Bernoulli mixtures. This improvement dropped down the error rate on the above dataset from 44.00% to 30.90% when 64-mixture states were used. The system is evaluated on a more challenging dataset comprising English text lines extracted from IAM database as described in Giménez et. al. 2009, "Embedded Bernoulli Mixture HMMs for Continuous Handwritten Text Recognition," In Computer Analysis of Images and Patterns, 197-204. Best recognition error rate of 42.10% was achieved by using of 6-state models and 64 mixtures per state. To capture contextual information in the observations, the sliding window technique was proposed in Giménez, A., Khoury, I., and Juan, A., 2010, "Windowed Bernoulli Mixture HMMs for Arabic Handwritten Word Recognition," In 2010 12th International Conference on Frontiers in Handwriting Recognition, 533-38, IEEE. A narrow sliding window of few columns is passed over the text line with a stride of one pixel. The columns under the window are concatenated and taken as a single observation. The impact of the sliding window technique was assessed on Arabic handwritten text using institute of communications technology/Technical University Braunschweig (IFN/ENIT) database described in Pechwitz, Mario, Maddouri, S., Märgner, V., Ellouze, N., and Amiri, H., 2002, "IFN/ENIT—Database of Handwritten Arabic Words," in Colloque International Francophone Sur l'Écrit et Le Document, 129-136, Friborg, Switzerland. Character recognition error rate of 12.30% was achieved by a sliding window of 9 pixels. To reduce the effect of image distortion, a sliding window repositioning technique was described in Alkhoury, I., Giménez, A., and Juan, A., 2012, "Arabic Handwriting Recognition Using Bernoulli HMMs," In Guide to OCR for Arabic Scripts, 255-72, London: Springer London. The sliding window is translated such that the window center is aligned with the center of mass of the text portion overlaid by the window. The observation is constructed from the columns overlaid by the translated window. To assess the impact of the sliding window repositioning technique in reducing the vertical image distortion, it was applied to the traditional Gaussian-based HMMs recognition system as described in Doetsch, P., Hamdani, M., Ney, H., Giménez, A., Andres-Ferrer, J., and Juan, A., 2012, "Comparison of Bernoulli and Gaussian HMMs Using a Vertical Repositioning Technique for Off-Line Handwriting Recognition," in 2012 International Conference on Frontiers in Handwriting Recognition, 3-7, Bari, Italy, IEEE. The system was compared with Long-Short-Term-Memory (LSTM) which is powerful in tolerating vertical image distortion. The experiments were carried out on Arabic IFN/ENIT and French RIMES datasets showed that window translation improves the recognition accuracies of both the HMM- and LSTM-based systems described in Augustin, E., Brodin, J., Cane, M., Geoffrois, E., Grosicki, E., and Prêteux, F., 2006, "RIMES Evaluation Campaign for Handwritten Mail Processing," in Workshop on Frontiers in Handwriting Recognition, 1-5, La Baule, France.

In order to improve the accuracy of Arabic handwriting text recognition and to improve processing speed, a system was developed to provide improved automated Arabic handwriting recognition performance.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to an Arabic handwriting recognition method that acquires an input image representative of a handwritten Arabic text from a user, partitions the input image into a plurality of regions, determines a bag of features representation for each region of the plurality of regions, models each region independently by multi stream discrete Hidden Markov Model (HMM), and identifies a text based on the HMM models.

In another aspect, the present disclosure relates to a system for Arabic handwriting recognition. The system includes a client device and a server. The server includes processing circuitry. The processing circuitry is configured to acquire an input image representative of a handwritten Arabic text from the client device, partition the input image into a plurality of regions, determine a bag of features representation for each region of the plurality of regions, model each region independently by multi stream discrete Hidden Markov Model (HMM), and identify a text based on the HMM models.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
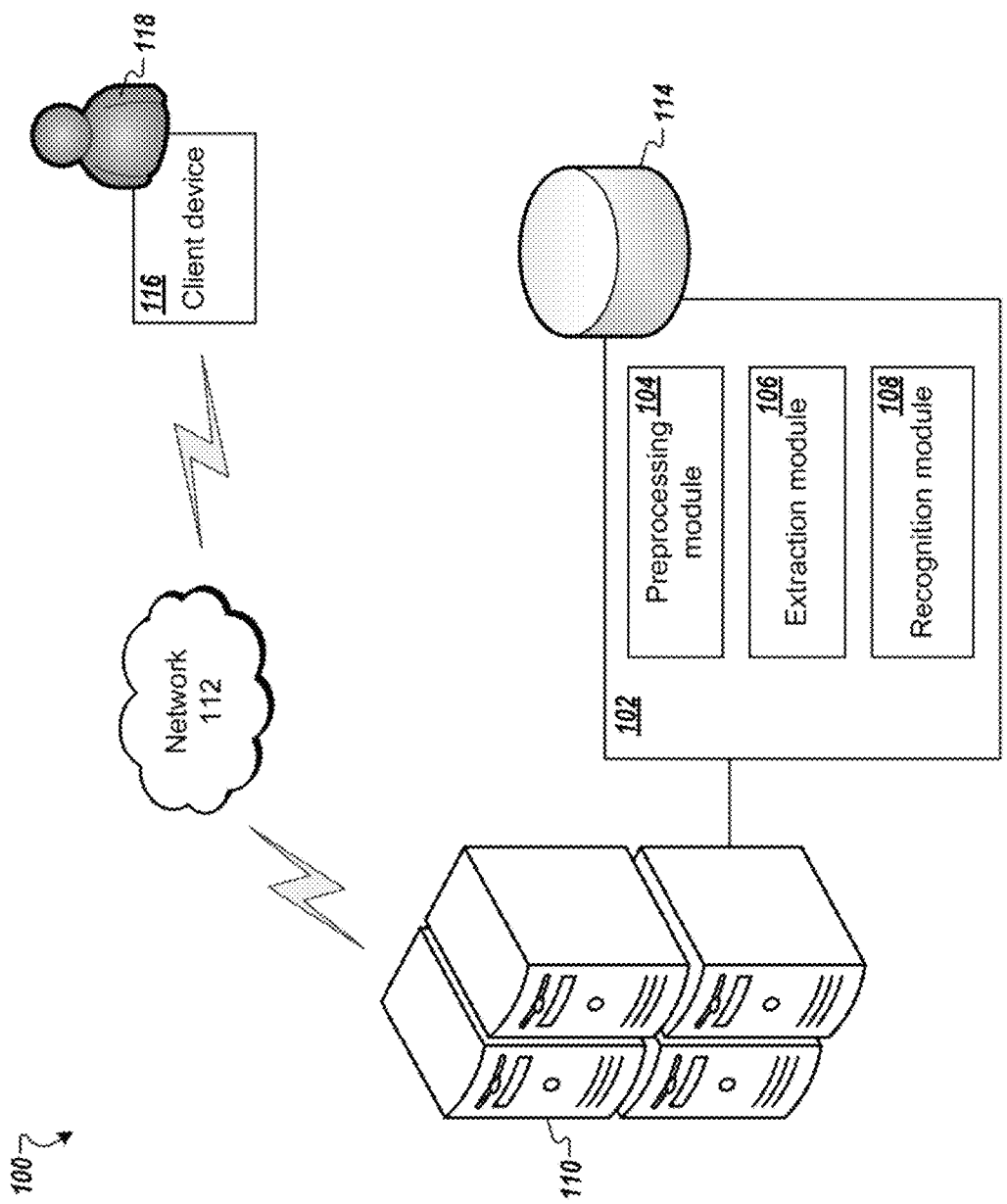
FIG. 1 illustrates an exemplary environment for performing Arabic handwriting recognition according to one.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Referring now to the drawings, wherein like reference numerals designate identical or corresponding parts throughout several views, the following description relates to a system and associated methodology for Arabic handwriting recognition.

FIG. 1 illustrates an exemplary environment 100 for performing Arabic handwriting recognition according to one example. The environment 100 may include a recognition system 102. The recognition system 102 includes various processing components, which may be embodied in hardware and/or software. The recognition system 102 may operate on a server 110 and/or a computer 1224. The recognition system 102 includes a preprocessing module 104, a local feature extraction module 106, and a recognition module 108. The recognition system 102 may be an interactive system which is continuously responsive to inputs from a user 118.

The modules described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

The local feature extraction module 106 is configured to extract local features from a text image (i.e., sample text). The local feature extraction module 106 is configured to apply a sliding window as described later herein. The preprocessing module 104 is configured to normalize the text image to a predetermined height (e.g., 96 pixels) while preserving the aspect ratio. The recognition module 108 is configured to recognize Arabic characters based on Hidden Markov Model (HMM) based on bag of features as described later herein.

In some implementations, the processes associated with each of the modules may be performed by one or more processors of a server or other computing resources, which can include cloud computing resources.

Documents to be processed by the recognition system 102 are received from a suitable source of such documents, such as a scanner, camera, data storage device, or the like. Each document may include one or more digital pages, each page including one or more images. In one implementation, the documents to be processed include scanned images of physical documents which include text that may be handwritten (e.g., in cursive script), such as correspondence. In one implementation, the documents may be received via a client device 118 via a network 112. The recognition system 102 may process the received documents and perform one or more actions based on the recognized text and/or a user input. The recognition system 102 may output the recognized text to other applications. For example, the recognized text may be used to automatically fill information fields such as personal data, financial data, and the like. For example, the recognition system 102 may be associated with a financial system, medical information system, or the like.

The network 112 is any network that allows the server 110 and the client device 116 to communicate information with each other. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The client device 116 may include a personal computer, a tablet, a smartphone, or the like. The client device 116 may include a user interface such as a keyboard, a keypad, a trackball, a touch screen, a voice recognition input device, or the like.

The recognition system 102 may include one or more databases 114. The one or more databases 114 may store lookup tables for computing gradient magnitude and orientation and training data as described further below. The one or more databases of the system 102 may be implemented in a memory of the server 110.

In the Bag-of-Features framework, an image is represented by the frequencies of occurrences of its local features as described in O'Hara, S. and Bruce D., "Introduction to the Bag of Features Paradigm for Image Classification and Retrieval," Computer Vision and Pattern Recognition. The framework includes two-phases: codebook generation and BoF vector construction. The codebook is generated by extracting local features from the training data and clustering those features using off-the-shelf clustering algorithms. The codebook is the set of clusters' centroids where each centroid is called a codeword. The BoF vector of an image is constructed by extracting local features from the image. Each extracted feature is quantized to the closest codeword in the codebook, where the closeness relation is defined based on a distance metric. The frequency of each visual word is used to represent the image. SIFT descriptors are the de-facto standard for representing local image features in the Bag-of-Features framework as described in Lowe, D. "Distinctive Image Features from Scale-Invariant Keypoints," International Journal of Computer Vision 60, pp. 91-110. Despite the discriminative power of SIFT, SIFT has two main drawbacks. The first is the computational overhead due to the extensive computations involved in evaluating the gradient magnitude and orientation and the associated pre-smoothing step necessary for improving the gradient quality. The second is the high dimensionality of the resulting feature vector. The methods described herein reduces the dimensionality of SIFT descriptors and speeds up the computation of the gradient magnitude and orientation by utilizing the characteristics of the handwritten text.

Figure 2:
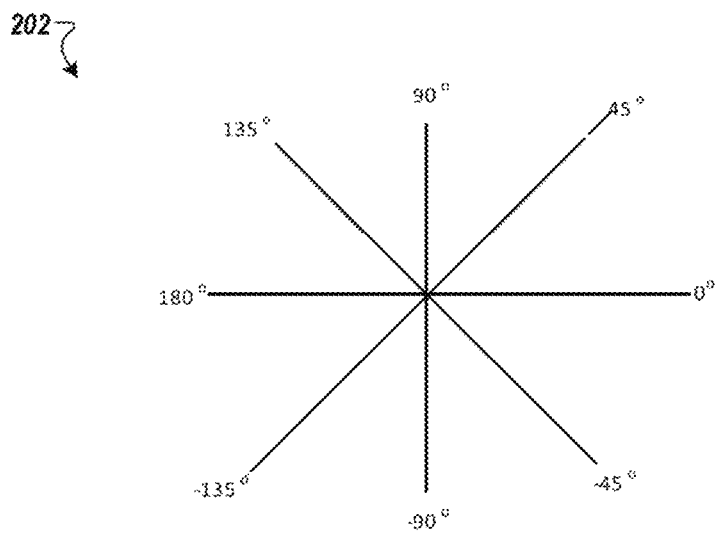
FIG. 2 is a schematic that shows orientation quantization according to one example.
Figure 2:
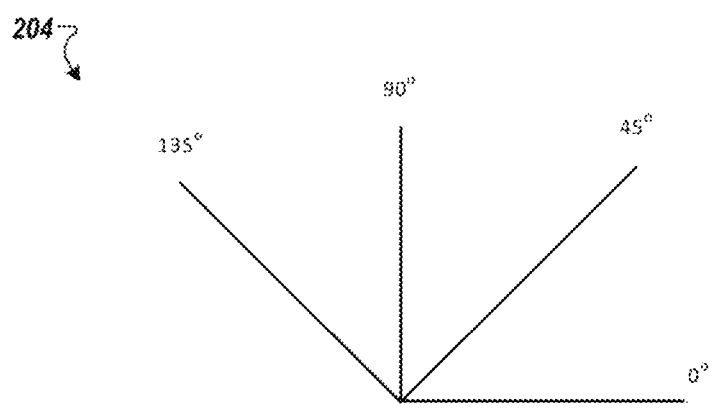
Figure 3:
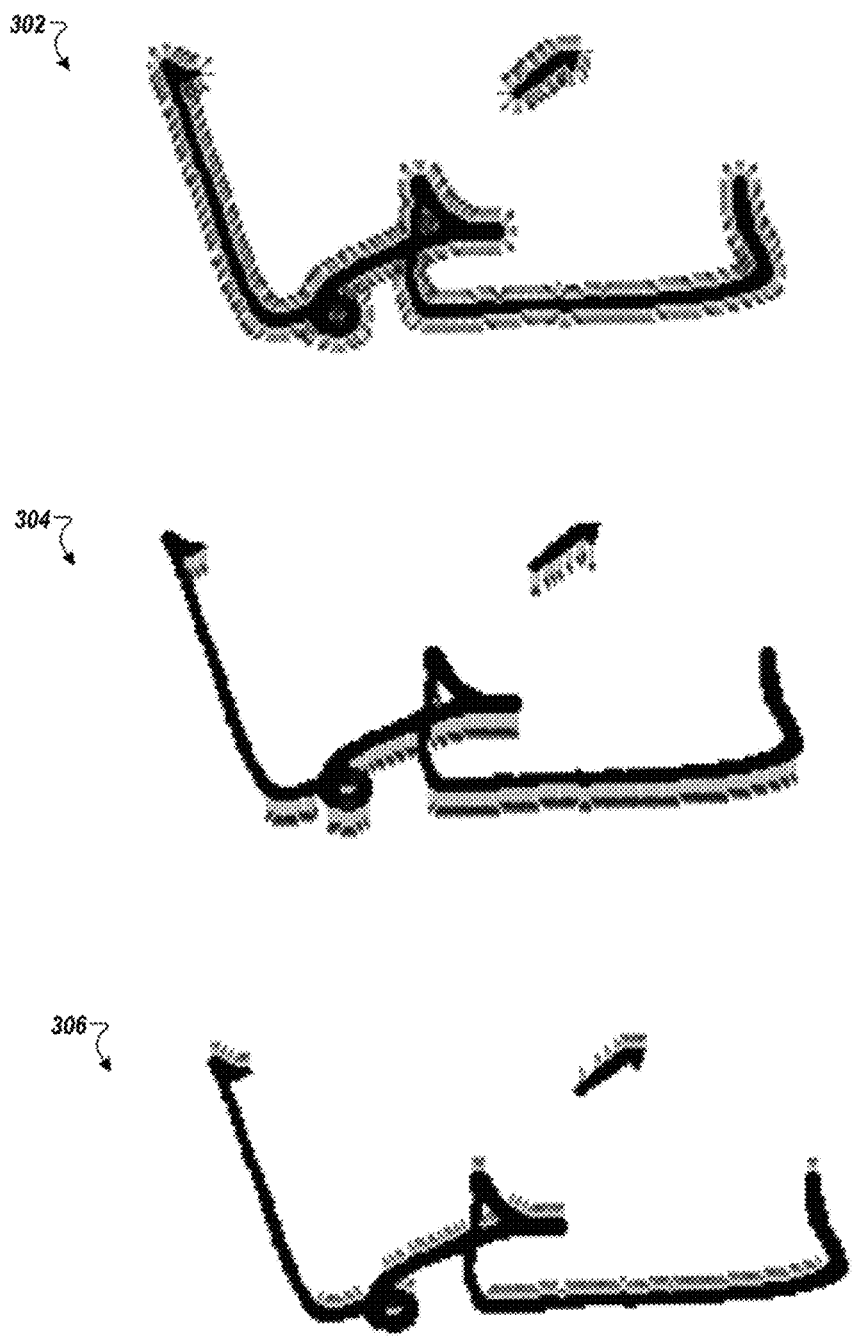
FIG. 3 is a schematic that shows pixel orientation with respect to text orientation according to one example.

SIFT descriptor relies on the distribution of the gradient magnitude to describe the regions of interest. Once the pixels' gradient magnitude and orientation are determined, the patch spatial area is divided into 4×4 regions and the 360-degree gradient orientation range is quantized into 8 orientation bins as shown in FIG. 2. The histogram of the gradient magnitudes at each region is determined resulting in a descriptor vector of 4×4×8=128 elements for the patch. In text recognition, the text orientation regardless of the pixels orientation is used. For instance, when a pixel shows −90° orientation, this indicates that the pixel lies on the lower edge of a horizontal text whereas +90° orientation indicates that it lies on the upper edge of a horizontal text. In both cases the text is horizontal as shown by schematics 302, 304, and 306 of FIG. 3. The two symmetric orientation bins can be combined into a single bin, giving 4 orientation bins instead of 8 (schematic 202) as shown in schematic 204 of FIG. 2. The descriptor dimensionality is reduced from 128 to 64. Note that the distance between the two adjacent bins is still 45° similar to the SIFT algorithm. The value of the negative orientation bins are accumulated to the corresponding symmetric positive orientations as the orientation sign may be insignificant in describing the direction of the text lines. This modification produces shorter vectors of the same discriminative power of the SIFT algorithm.

In order to compute the pixels' gradient magnitude and orientation, the SIFT algorithm applies the basic derivative filters ($h_x=[-1\ 0\ 1]$, $h_y=[-1\ 0\ 1]^T$) for evaluating the horizontal and vertical derivatives (dx, dy) at each pixel. The justification of using the basic derivative filters rather than large filters like Prewitt or Sobel filters is that the image has to be pre-smoothed by Gaussian kernels in the previous stages of interest regions detecting. The enhanced filter like Prewitt or Sobel take derivative in one direction and smooth in the orthogonal direction. Preceding the basic derivative filters by Gaussian smoothing makes them achieving the performance of other enhanced filters, e.g., Prewitt and Sobel. Implementations that applied SIFT on dense sampling like VLFeat dsift have to pre-smooth the image by Gaussian kernel proportional to the descriptor spatial area in order to make the descriptor less sensitive to noise.

Gaussian smoothing is computationally expensive. Several descriptors like the SURF, BRIEF, and LDP approximate the Gaussian smoothing by box filters that could be efficiently implemented by integral images as described in Bay, H., Ess, A., Tuytelaars, T., and Van Gool, L. 2008, "Speeded-Up Robust Features (SURF)," Computer Vision and Image Understanding 110 (3): 346-59, Calonder, M., Lepetit, V., Ozuysal, M., Trzcinski, T., Strecha, C., and Fua, P., 2012, "BRIEF: Computing a Local Binary Descriptor Very Fast," IEEE Transactions on Pattern Analysis and Machine Intelligence 34 (7): 1281-98, Yang, X., and Cheng, K., 2014, "Local Difference Binary for Ultrafast and Distinctive Feature Description," IEEE Transactions on Pattern Analysis and Machine Intelligence 36 (1): 188-94. In the case of handwritten text where the images are binary, the noise associated with the images is due to the writing style and the binarization algorithm. The noise appears as sharp edges due to the transition from 0 to 1 or from 1 to 0. Applying Gaussian smoothing would attenuate these edges rather than permanently eliminate the notches on the text borders Moreover, smoothing affects the (binary) values of almost all pixels even those pixels that are far from the edges of the text line. The changes in the values of the pixels in the middle of the text line generate noisy gradients.

Figure 4:
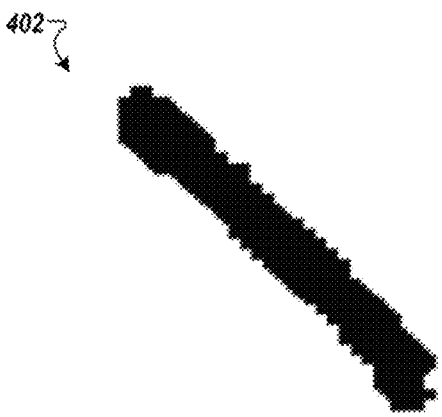
FIG. 4 is a schematic that shows a digital sample smoothed by a Gaussian Kernel according to one example.
Figure 4:
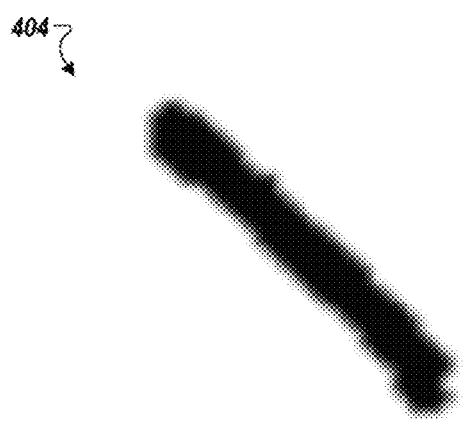

FIG. 4 is a schematic that shows a digital sample smoothed by a Gaussian Kernel according to one example. Schematic 402 shows an original digit. The original digit has 821 pixels of value 0. Schematic 404 shows the smoothed digit. The smoothed digit includes 8 pixels having a value of 0.

In one implementation, the basic derivative filters are applied by the extraction module 106 directly on the text images without smoothing. Since the images are binary, the filter response at any image pixel is one out of three values $\{-1, 0, 1\}$ based on the intensity value (0/1) of the left/right and top/bottom neighbor pixels. In one implementation, the gradient magnitude and orientation may be determined by referencing lookup tables stored in the database 114 instead of applying computationally expensive procedures for computing arctan and square-root functions. The lookup tables are shown below.

TABLE 1

Lookup tables for computing gradient magnitude and orientation

| $d_y$ | $d_x$ | | |
|---|---|---|---|
| | −1 | 0 | 1 |
| (a) gradient magnitude | | | |
| −1 | $\sqrt{2}$ | 1 | $\sqrt{2}$ |
| 0 | 1 | 0 | 1 |
| 1 | $\sqrt{2}$ | 1 | $\sqrt{2}$ |
| (b) gradient orientation before combining the symmetric orientation bins | | | |
| −1 | −135° | −90° | −45° |
| 0 | +180° | +90° | 0° |
| 1 | +135° | +90° | +45° |
| (c) gradient orientation after combining the symmetric orientation bins | | | |
| −1 | +45° | +90° | +135° |
| 0 | 0° | +90° | 0° |
| 1 | +135° | +90° | +45° |

The possible values of the gradient orientation are exactly the 8 orientation bins shown in schematic 202 of FIG. 2 that implies the gradient magnitude can be accumulated to exactly one bin according to its orientation. Utilizing the lookup tables enable to construct faster SIFT descriptor compared with the original algorithm. Using the reduction approach described previously herein, the descriptor dimensionality could be reduced to half by combining the corresponding symmetric orientation bins. The lookup table for computing pixel orientation after combining the corresponding symmetric orientations is shown in Table 1 above.

Described herein are two SIFT methods, named unsigned-SIFT and binary-SIFT. Unsigned-SIFT smoothes the input image by a Gaussian kernel proportional to the descriptor spatial area. Gradient magnitudes and orientations are determined using the same procedures as VLFeat dsift. However, instead of generating 8 bins in each of the 4×4 spatial regions, the contributions of the corresponding symmetric orientation bins are accumulated, giving 4 bins per region. Accordingly, unsigned-SIFT produces a 64-D descriptor for the input patch. In binary-SIFT, the Gaussian smoothing step is eliminated and the gradient magnitude and orientation are calculated for the binary image using table 1. Similar to Unsigned-SIFT, the contributions of the corresponding symmetric orientation bins within each spatial region are accumulated, giving a 64-D descriptor for the patch. The open-source VLFeat library is used as a tool to implement the methods described herein by modifying dsift command, which is an efficient implementation for extracting dense SIFT descriptors for gray-scale images.

To evaluate the performance the methods described herein, the methods were integrated with the implementation of the Bag-of-Feature framework described herein. Several experiments on the non-touching Arabic Indian digit and non-touching Arabic subwords datasets are conducted. In these experiments, dense sampling with four patch sizes (16, 24, 32 and 40 pixels) and a stride of 2 pixels in the four grids is used. The original SIFT as well as the two versions described herein were applied in the description step. The obtained descriptors are de-correlated by applying PCA. Five codebooks of sizes 128, 256, 512, 1024 and 2048 are generated by k-means clustering, and the hard assignment is utilized in the quantization step.

Figure 5:
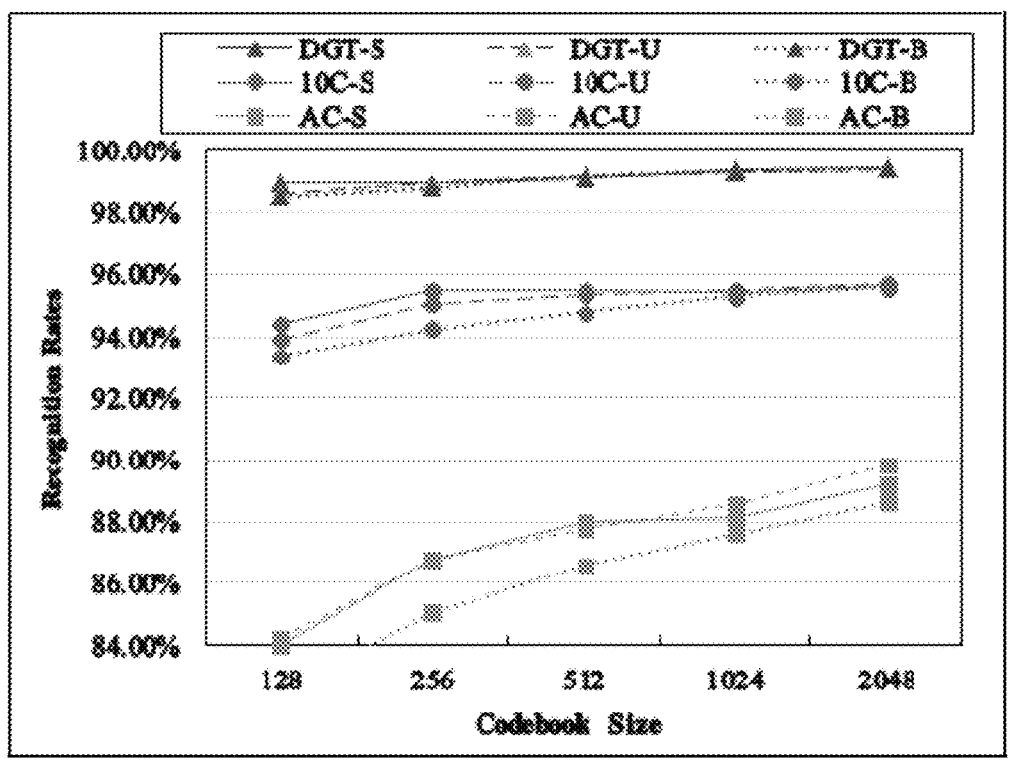
FIG. 5 is a schematic that shows recognition accuracies of three SIFT methods according to one example.

FIG. 5 is a schematic 500 that shows recognition accuracies of the three SIFT methods according to one example. The results show that unsigned-SIFT and binary-SIFT achieve comparable performance to the original SIFT, although their descriptors have only 64 elements. The two versions achieved better performance with larger codebooks in the digits and the most frequent 10 sub-word classes. In the complete sub-words dataset, however, the binary-SIFT was the worse. This might be attributed to the lack of enough training samples. In addition to the promising recognition accuracies, the two versions take less time to compute.

Due to their lower dimensionality, the clustering and quantization became faster. Table 2 shows the CPU times of computing the descriptors of the non-touching Arabic Indian digit dataset using the original SIFT and the two approaches described herein. The CPU times of clustering three sets is shown, each with one million random descriptors generated by one of the three versions into 1024 clusters. The two methods described herein achieved up to 2.16× speedup in description generation and clustering steps, which indicates that utilizing the characteristics of the handwritten text has reduced the computational overhead.

TABLE 2

CPU time (in milliseconds) elapsed in calculating the descriptors of the non-touching Arabic Indian digit dataset and in clustering 1 million descriptors into 1024 clusters

|  | SIFT | Unsigned-SIFT | Binary-SIFT |
| --- | --- | --- | --- |
| Descriptors Computation | 211.20 | 121.43 | 97.54 |
| Clustering | $507.13 \times 10^3$ | $341.07 \times 10^3$ | $356.37 \times 10^3$ |

Handwriting Recognition systems based on the Hidden Markov Models (HMMs) may be applied for cursive text recognition of several scripts, including Arabic as described in Parvez, M., and Mahmoud, S., 2013, "Offline Arabic Handwritten Text Recognition: A Survey," ACM Computing Surveys 45 (2): 1-35 and Fink, G., 2014, Markov Models for Pattern Recognition, Second Edi., Berlin, Heidelberg: Springer Berlin Heidelberg. HMMs require sequence of observations representing the input patterns. In one implementation, the observations are a sequence of BoF representation. To generate a sequence of observations for a text line image, a sliding window strategy may be applied by the extraction module 106 to produce a sequence of narrow windows from the text image. Each window is partitioned into square cells of size w×w pixels, where w is the window width. The windows as well as the cells within the window might be overlapped. For each cell, one or more local descriptors are generated by the extraction module 106 such that the centers of the one or more local descriptors coincide with the cells' centers. The descriptors are used to determine a global BoF representation for the window. Furthermore, for imposing spatial localization in the window representation, the window is partitioned into three regions based on the text baseline. The local descriptors whose centers are within the region are used in calculating an independent BoF representation for that region. Dense sampling strategy ensures that each window produces a fixed number of local features, in contrast with the interest regions that might not be detected in some windows. In addition, the alignment of the multi-scale descriptors to the region center enables them to represent the region neighborhood at different scales, in contrast with traditional approaches that drawing Ad-hoc multi-scale descriptors for dense sampling strategy.

For each of the window cells, several descriptors of different spatial scales are computed by the extraction module 106. The descriptors of the first scale have size identical to the cell size. The descriptors of the second scale expand the cell boundaries by 2 pixels from each side, the third scale by 4 pixels from each side and the forth scale by 6 pixels from each side and so on. This strategy ensures that all the descriptors are aligned with the cell's center. For cells of 8×8 pixel size, the 4-scale descriptors have sizes of 8×8, 12×12, 16×16 and 20×20.

Figure 6:
FIG. 6 is a schematic that shows 4-scale descriptors on a sample text according to one example.

FIG. 6 is a schematic 600 that shows 4-scale descriptors on a sample text according to one example. Aligning the multi-scale descriptors to the cell center enables the multi-scale descriptors to represent the cell neighborhood at different scales.

This procedure ensures that each window produces a fixed number of local features, in contrast with the interest regions that might not be detected in some windows. Furthermore, the large number of the produced local descriptors enriches the BoF representation. The number of the extracted local features depends on the image height, the window width and the cell's stride parameter that determines the degree of cells' overlapping (the smaller the stride, the more the overlapping) and the number of the descriptor's scales. Table 3 shows the number of the extracted local features for different windows, cell strides and descriptor scales. The image height is normalized to 96 pixels.

TABLE 3

Number of the extracted SIFT descriptors for different values of windows width, cell strides and descriptor scales

| Window Width | Cell Stride | Descriptor scale | #Descriptors/Window |
| --- | --- | --- | --- |
| 4 | 4 | 1 | 24 |
| 4 | 2 | 1 | 48 |
| 8 | 8 | 1 | 12 |
| 8 | 4 | 1 | 23 |
| 8 | 2 | 1 | 46 |
| 12 | 12 | 1 | 11 |
| 12 | 4 | 1 | 22 |
| 12 | 2 | 1 | 44 |
| 8 | 2 | 2 | 92 |

TABLE 3-continued

Number of the extracted SIFT descriptors for different
values of windows width, cell strides and descriptor scales

| Window Width | Cell Stride | Descriptor scale | #Descriptors/ Window |
|---|---|---|---|
| 8 | 2 | 3 | 138 |
| 8 | 2 | 4 | 184 |

Since the samples' spatial area is usually very tight, e.g., 8×8 pixels, the descriptor layout is modified. The spatial area is partitioned into 2×2 sub-regions, instead of the 4×4 sub-regions used in the normal SIFT algorithm. For each region, the 8-bins gradient magnitude and orientation histogram is computed by the extraction module 106. This gives a 32-D (2×2×8) descriptor for each cell. The special case is the narrowest window used, the window of 4 pixels width, where the 4×4-pixel cells are considered as a single region. For such cells, the SIFT algorithm gives 8-D descriptors.

Figure 7:
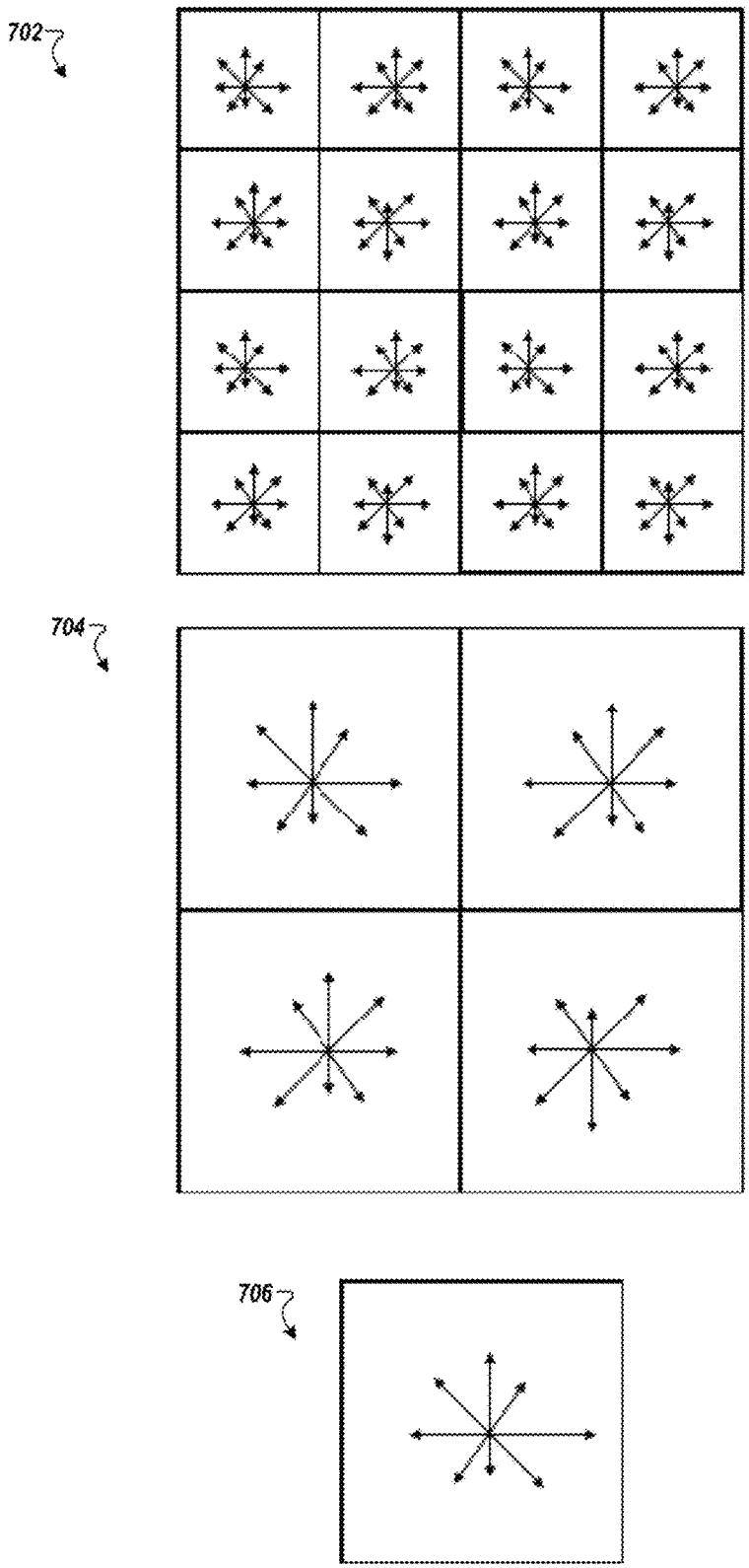
FIG. 7 is a schematic that shows a layout of the original SIFT and of a modified SIFT according to one example.

FIG. 7 is a schematic that shows a layout 702 of the original SIFT, a second layout 704 associated with a modified SIFT in which the gradient histogram is computed in 2×2 regions. A third layout 706 shows the SIFT for 4×4 pixel cells. The gradient histogram is computed in a single region.

The modification in the descriptor layout is crucial for the quality of the local descriptors. The 4×4 spatial regions used in the SIFT algorithm produces poor gradient histograms due to the few pixels in the regions. For instance, partitioning the 8×8 cell into 4×4 regions gives 16 regions, each includes 4 pixels (2×2). Distributing the gradient magnitude of 4 pixels between the 8 orientation bins leads to poor histograms. In contrast, the 2×2 regions gives 4 regions, each of 16 pixels (4×4). The distribution of the gradient magnitude of 16 pixels between 8 orientation bins is more representative compared to the previous case.

One of the shortcoming of the BoF representation is the lack of spatial localization in the representation, as the representation is a global histogram of the occurrences of the local features. To observe the spatial localization within the window representation, the window is partitioned into three vertical regions, utilizing the writing baseline property of Arabic text as described in Ahmad, I., Mahmoud, S., and Fink, G., 2016, "Open-Vocabulary Recognition of Machine-Printed Arabic Text Using Hidden Markov Models," Pattern Recognition 51 (March): 97-111. The writing baseline of a text line is estimated based on the horizontal projection profile. The line image is partitioned into three regions such that the writing baseline is located in the middle region. The height of the middle region is adjusted such that it contains the main text. The lower and upper regions may contain the peripheral parts like the lower/upper parts of long letters and the diacritics as shown in FIG. 8.

Figure 8:
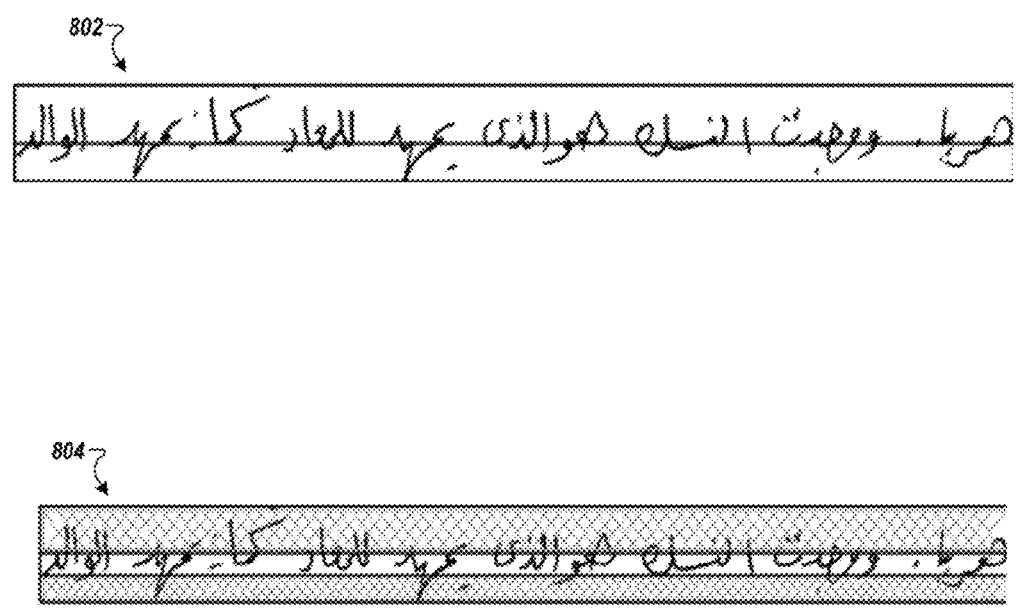
FIG. 8 is a schematic that shows the baseline and the boundaries of three regions for a sample image according to one example.

FIG. 8 is a schematic that shows the baseline and the boundaries of three regions for a sample image according to one example. Schematic 802 shows the estimated baseline. Schematic 804 shows the text line partitioned into three regions such that the middle region includes 50% of the black pixels. Due to the large variability in the unconstrained handwritten text, the partitioning might not be accurate. However, it is useful for estimating the location of crucial text components like the dots. The local descriptors whose centers are within the region are used in computing an independent BoF representation for that region. The three BoF representations are concatenated to include the final window observation or the BoF representations are modeled independently using multi-stream HMMs. Additionally, the global BoF representation could also be calculated from the whole window descriptors and used to provide global window representation.

Due to the large dimensionality of the BoF representation, it is hard to model them directly by the traditional continuous Gaussian-based Hidden Markov Models (GHMM). In one implementation, the Discrete Hidden Markov Models (DHMM) is used to model the window representation.

The independent BoF representations obtained from the partitioning of the text image into three regions motivate us to exploit the multi-stream DHMMs to model them. The BoF representation of each region of the sliding window is modeled independently by the HMMs. The middle region is assumed to provide representation for the letter core shape while the upper and upper would provide information to discriminate the letters that have similar shapes e.g., the two Arabic letters TAA (ﺙ) and (ﺕ).

To illustrate the capabilities of the system and methods described herein, exemplary results are presented. The experimentations were carried on the distinct lines of KHATT database, the public open-vocabulary database described in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3): 1096-1112. The dataset comprises 6712 distinct Arabic handwritten lines from large corpus written by 1000 writers of different ages, gender, educational level and handedness from different countries. The lines are distributed among training, validation and test sets. Table 4 shows useful statistics of the dataset.

TABLE 4

Statistics of the distinct handwritten lines in KHATT database

|  | #Lines | #Words | #characters (with space) | #characters (without space) |
|---|---|---|---|---|
| Training | 4808 | 55,893 | 301,924 | 260,455 |
| Validation | 938 | 11,113 | 59,507 | 49,633 |
| Testing | 966 | 10,675 | 58,463 | 48,754 |
| Total | 6,712 | 77,681 | 419,894 | 358,842 |

The dataset was used to evaluate a HMM-based recognition system. Best character accuracies of 46.70% and 46.13% were reported on the validation and test sets, respectively. Other workers experimented with KHATT database as described in Hamdani, M., El-Desoky A., and Ney, H., "Open Vocabulary Arabic Handwriting Recognition Using Morphological Decomposition," In 12th International Conference on Document Analysis and Recognition (ICDAR 2013), 280-84, and Stahlberg, F. and Vogel, S., 2015, "The QCRI Recognition System for Handwritten Arabic," In International Conference on Image Analysis and Processing (ICIAP 2015), 276-86, Genova, Italy, Springer International Publishing. However, these workers used distinct and fixed lines datasets in their experiments. Furthermore, these workers utilized a word-level language model and sophisticated sub-lexical approach to address out-of-vocabulary problem. The recognition accuracies were reported at the word level. These differences make these two efforts incomparable to the method described herein. The results from the methods described herein are compared with those reported in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3): 1096-1112, since the same HMM recognizer and the same dataset are used. The differences are in the feature extraction, the adaptation techniques and the utilization of character-level bi-gram language model.

The handwritten text recognition system takes a text line image and reports the transcription of the text. The system has three main phases, preprocessing, feature extraction and recognition. In the preprocessing phase, the line images are normalized to 96-pixel height while preserving the aspect ratio. Then the slant and skew of the text lines are corrected as described in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3): 1096-1112. To observe the right-to-left writing style of Arabic language, the images are flipped left-to-right. Two blank windows are appended to the text lines, one at the beginning and one at the end, to ensure that the extracted observations cover the entire text in the line image. For extracting multi-scale descriptors, few white pixels might be padded to the boundaries of the line image to ensure that all descriptors are aligned with the cells' centers.

In the feature extraction phase, the BoF representation is calculated. SIFT descriptors are computed for the cells of the sliding window. The zero-valued descriptors are excluded from the codebook learning and quantization steps as described in Law, M., Thome, N., and Cord, M. 2014, "Bag-of-Words Image Representation: Key Ideas and Further Insight," In Fusion in Computer Vision, Advances in Computer Vision and Pattern Recognition, 29-52, Springer International Publishing. The non-zero descriptors are de-correlated by applying PCA and quantized to the closest codeword in the codebook. The codebook is learned by applying the k-mean clustering algorithm on a set of one million de-correlated descriptors selected randomly from the training samples. The codebook size is tuned in the validation set and the best value is used in the test set evaluation. The final window representation is the BoF representation obtained by the average pooling. The implementations provided by the VLFeat open-source library as described in Vedaldi, A., and Fulkerson, B., 2010, "VLFeat: An Open and Portable Library of Computer Vision Algorithms," In 18th ACM International Conference on Multimedia, 1469-72, Firenze, Italy, for implementing the different algorithms of the BoF framework are used.

In the recognition phase, the discrete HMMs to cope with the large dimensionality of the observation vectors are used. The observation vectors are quantized into discrete symbols based on a predefined codebook that is learned from the training samples. The different shapes of the Arabic characters are modeled by separate Markov models. The total number of models in the system is 153, corresponding to all character shapes, ligatures, digits and punctuation marks in the database. In the final results, the different shapes of the same characters are merged and considered as a single model. The total number of these shapeless classes is 61. The number of states in the models are tuned in the validation set and the best value is used in the test set evaluation. In one implementation, all models have the same number of states using Bakis topology as the models with variable number of states didn't show significant improvements in the initial experiments. The models are trained based on the two-phase training strategy. In the first phase, the parameters of a single model are initially estimated from the training observation sequences. In the second phase, the initialized model is cloned to all the models in the system and they are re-trained by several iterations of Baum-Welch algorithm.

The recognition is performed by the Viterbi decoding with character bi-gram language model that learned from the transcriptions of the training set. The HTK toolkit described in Young, S., Evermann, G., Gales, M., Hain, T., Kershaw, D., Liu, X., Moore, G., 2006, The HTK Book (for HTK Version 3.4) is used as a tool to implement the recognition system described above. Though the HTK toolkit has auxiliary tools for k-mean clustering (HQUANT) and vector quantization (HCOPY), the VLFeat implementations for k-means clustering and vector quantization are used.

Several experiments on the validation set are conducted in order to study the impact of the various parameters on the system performance. The impact of the sliding window parameters and the local features is described next.

A sliding window of few pixels width is used to generate a sequence of observations for a line image. The window is partitioned into vertical cells for which the SIFT descriptors are computed. The windows as well as the cells within the window might be overlapped. The window stride determines the windows overlapping while the cell stride determines the cells overlapping. The window width and stride, the cell stride and the number of the extracted descriptors for a cell have high impact on the system performance. The larger the window is, the more the contextual information are observed. However, wider windows might cover more than a single character. Smaller window stride helps in generating sufficient observations for the line image and smaller cell stride helps in generating more descriptors. Multi-scale descriptors capture more contextual information and provide scale invariance. They also increase the number of the local features.

Table 5 shows the system performance on the validation set using different window widths, window strides, cell strides and the multi-scale descriptors. The performance is given in the character accuracy rate where the substitution, deletion and insertion errors are discounted. In all experiments, the size of the BoF and HMM codebooks are 256, as this value achieved the best performance in the initial results. The number of the HMMs states are varying between 4 and 14 states and the best result is reported. The initial experiments showed that best accuracies were achieved using the number of states in this range.

TABLE 5

The impact of window width, window stride, cell stride and number of descriptor's scales on the validation set

| Window Width | Window Stride | Cell Stride | #Scales | Character Accuracy % |
|---|---|---|---|---|
| 4 | 4 | 4 | 1 | 37.10% |
| 4 | 4 | 2 | 1 | 39.80% |
| 4 | 2 | 2 | 1 | 41.30% |
| 8 | 8 | 2 | 1 | 38.10% |
| 8 | 4 | 2 | 1 | 43.30% |
| 8 | 2 | 2 | 1 | 42.30% |
| 12 | 6 | 2 | 1 | 43.20% |
| 8 | 4 | 2 | 2 | 45.90% |
| 8 | 4 | 2 | 3 | 47.10% |
| 8 | 4 | 2 | 4 | 48.40% |

The results show that windows of 8-pixel width have better performance than the 4- and 12-pixel width windows. Half overlapping of the 4- and 8-pixel width windows gave best results. Overlapping of 75% of the 8-pixel width window (i.e., the window stride of 2) doesn't improve the results. The 2-pixel cell stride achieved better performance than the 4-pixel stride in the 4-pixel width windows. The multi-scale descriptors have high impact on the accuracy.

The 4-scale descriptors with the 8-pixel width windows improved the performance by 5.10% accuracy (it achieved 48.40% accuracy, compared with 43.30% accuracy of the single-scale descriptors). The windows of 8-pixel width with 4-pixel stride (half-overlapping) and 2-pixel cell stride are used. For each cell, the 4-scale SIFT descriptors are extracted.

To assess the impact of utilizing the writing baseline and the multi-stream HMMs, three configurations are implemented. In a first configuration, the BoF representations of the three regions are concatenated and fed to a single-stream HMMs-based system. In a second configuration, the BoF representations of the three regions are fed to 3-stream HMMs-based system, and in a third configuration, a 4-stream HMMs-based system is used, where the forth stream represents the global BoF representation of the entire window (before partitioning into the three regions). In all configurations, the streams are weighted equally. The recognition accuracies of these systems are shown in Table 6. Utilizing the writing baseline has improved the performance by 4.90%, while the 3-stream HMMs system added extra 9.80% to the accuracy. The 4-stream HMMs system achieved 64.10% accuracy on the validation set, which is much better than the best state-of-the-art results reported in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3): 1096-1112, on the same dataset (46.70%) using the intensity and gradient statistical features.

TABLE 6

The performance utilizing the writing baseline and the multi-stream HMMs on the validation set

| Recognition System | Character Accuracy % |
|---|---|
| 1-stream HMMs | 53.30% |
| 3-stream HMMs | 63.10% |
| 4-stream HMMs | 64.10% |

The recognition performance on the test set is presented in Table 7. The best configuration using the 4-stream HMMs system has achieved 63.40% accuracy on the test set. This result outperforms the best results in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3): 1096-1112 on the test set (46.13%). The results show the power of the BoF framework in learning robust representations for handwritten text. The results indicate also that the careful adaptation of the framework to the HMM-based text recognition produces better observations for the handwritten text. Furthermore, exploiting the characteristics of the Arabic script in constructing the BoF representation has improved the quality of the produced observations.

TABLE 7

The recognition accuracy on the Test set

| Recognition System | Character Accuracy % |
|---|---|
| 1-stream HMMs | 52.50% |
| 3-stream HMMs | 61.10% |
| 4-stream HMMs | 63.40% |

The contribution of the representations of the different streams can be adjusted by assigning different weights to the streams. To assess the impact of the stream weighting, a set of experiments on the 4-stream HMMs-based system are conducted where different stream weights were used. Assigning higher weights to both the global window and middle region representations improves the character accuracy rate. The new rates we achieved on the validation and test sets are 65.00% and 64.30%, respectively.

A Bernoulli Hidden Markov Model (BHMM) is a hidden Markov model in which the state emission probability is modeled by multivariate Bernoulli mixtures. Assuming $q_t=j$ be the current state at time t, the probability that the system may generate the binary observation $o_t$ (denoted by $b_j(o_t)$) is given by $$b_j(o_t) = \sum_{k=1}^{K} \pi_{jk} \prod_{d=1}^{D} (p_{jkd})^{o_{td}} (1 - p_{jkd})^{1-o_{td}} \quad (1)$$

where K is the number of the mixture components, $\pi_{jk}$ is the prior probability of the $k^{th}$ mixture of state j, D is the dimension of the binary observation $o_t$, $P_{jkd}$ is the probability that the $d^{th}$ bit in the binary observation $o_t$ would be 1 according to the $k^{th}$ mixture of state j. Finally, $o_{td}$ is the $d^{th}$ bit in the binary observation $o_t$ as described in Giménez, A., and Juan, A., 2009a, "Bernoulli HMMs at Subword Level for Handwritten Word Recognition," In Pattern Recognition and Image Analysis, e, 497-504, Springer Berlin Heidelber.

The BHMM-based handwritten text recognition system was successfully applied to Arabic handwriting recognition and achieved recognizing performance in the closed vocabulary IfN/ENIT database as described in Alkhoury, I., Giménez, A., and Juan, A., 2012, "Arabic Handwriting Recognition Using Bernoulli HMMs," In Guide to OCR for Arabic Scripts, 255-72, Springer London. However, this prominent performance was attained by using wider sliding windows which in turn generate binary observations of high dimensionality. Described herein are two approaches that would reduce the dimensionality of the binary observations produced by the sliding window technique. Besides the dimensionality reduction, the second approach described herein imposes spatial localization to the observations by partitioning the window into small vertical cells prior to observation construction. The two approaches are referred to herein as local sampling approach and the local cell layers approach and they are described next.

The two approaches are dealing with a window of h×w pixels where h is the image height and w is the window width. w is assumed to be odd and the window stride is always one pixel. Therefore, the $i^{th}$ window is centered at the $i^{th}$ column to represent it with the context around.

Figure 9:
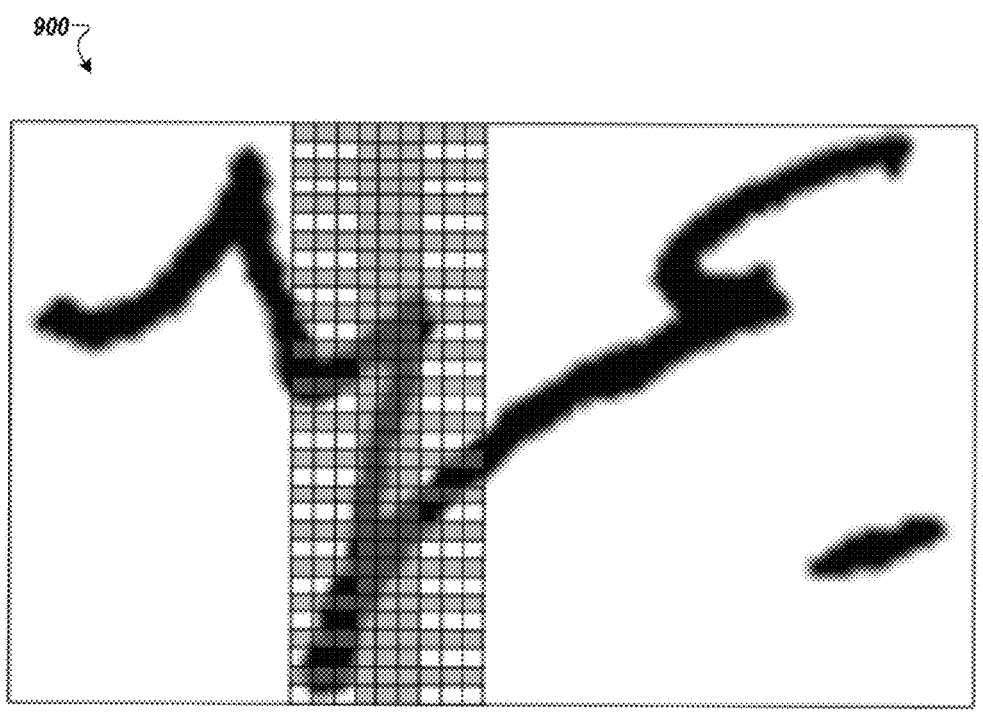
FIG. 9 is a schematic that shows local sampling for a window of size 32×9 according to one example.

In the local sampling approach, the columns that are farther from the window center (in the left and right sides) are alternatively sampled as shown in FIG. 9.

FIG. 9 is a schematic 900 that shows local sampling for a window of size 32×9. The farther columns can be represented well by their respective windows. For a current window, a partial view of them would be sufficient for capturing the contextual information. At least one-third of the columns in the center of the window non-sampled are preserved. The left and right sides are reduced to half by sampling them alternatively. The observation is composed by serializing the sampled left columns, the middle and the sampled right columns. This approach reduces the observation dimensionality approximately by a third. For 32-pixel height images, the 9-pixel width window produces 288-D observations while the local sampling approach produces 192-D observations which are two-thirds the dimensionality.

The local cell layers approach partitions the window into non-overlapping square cells of size w×w. The cells are processed in a layered fashion.

Figure 10:
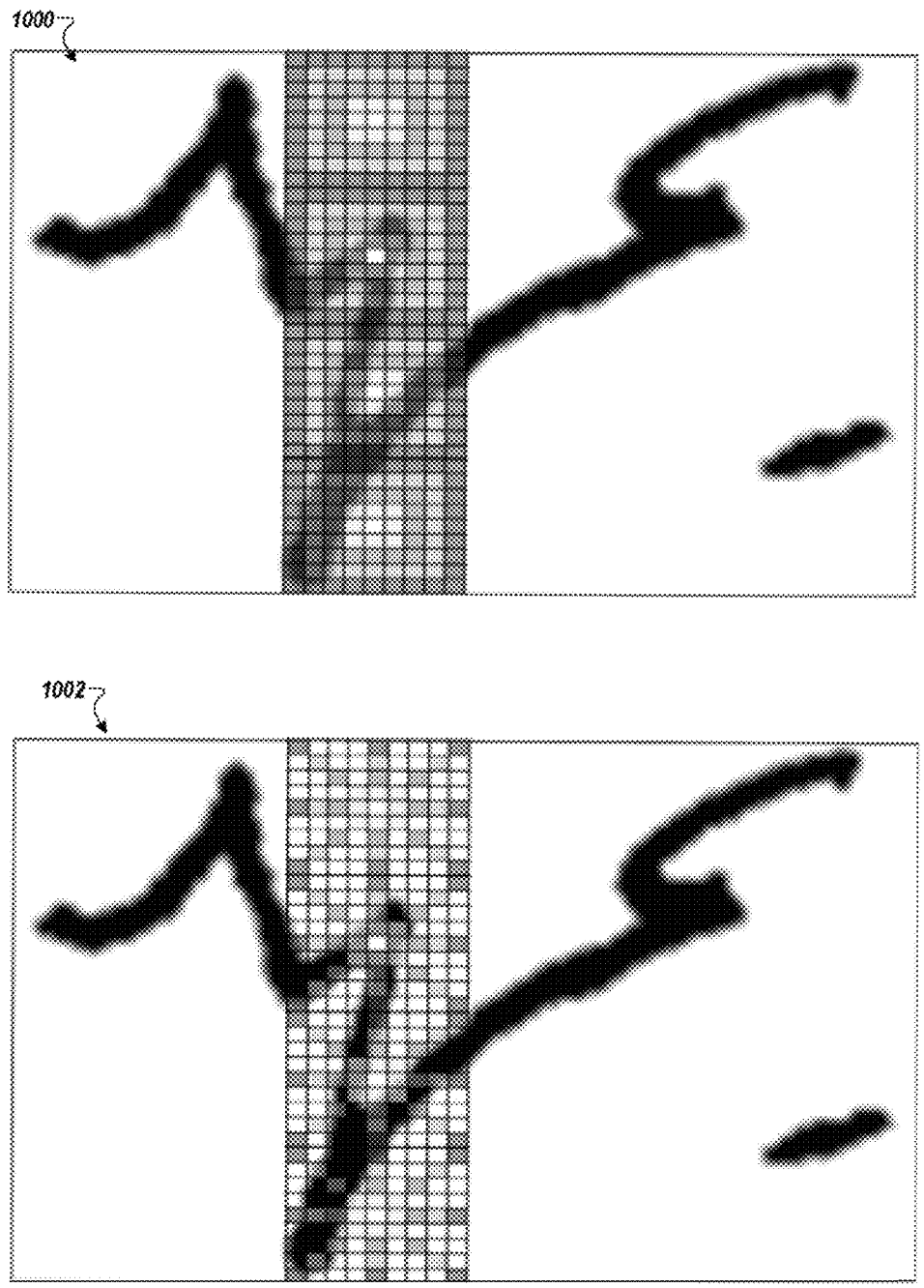
FIG. 10 is a schematic that shows local cell layers for the window of size 32×9 according to one example.

FIG. 10 is a schematic hat shows local cell layers for a window of size 32×9. Layer 1 consists of the 8-neighbors of the center pixel. Layer 2 consists of the 16 pixels surrounding the 8-neighbors and Layer 3 consists of the 24 pixels surrounding the 16 pixels in Layer 2 and so on as shown in schematic 1000. Eight pixels are selected from each layer. In one implementation, the pixels lying on the horizontal, vertical and the two diagonal axis passing through the cell center are selected as shown in schematic 1002. The selected 8 pixels are serialized, giving 8-D binary vector. The cell feature vector is the concatenation of the 8-D binary vectors of each layer. Correspondingly, the window observation is the concatenation of the cells' feature vectors.

Partitioning the window into vertical cells is common practice in traditional HMM-based handwriting recognition systems in order to impose localization in the window observations. The Local Binary Pattern (LBP) is described in Ojala, T., Pietikainen, M., and Harwood, D., 1996, "A Comparative Study of Texture Measures with Classification Based on Featured Distributions," Pattern Recognition 29 (1): 51-59 and Ojala, T., Pietikainen, M., and Maenpaa, T., 2002, "Multiresolution Gray-Scale and Rotation Invariant Texture Classification with Local Binary Patterns," IEEE Transactions on Pattern Analysis and Machine Intelligence 24 (7), 971-87. Unlike the LBP that thresholds the gray-level intensity of the pixels lying on fixed distance from the center, the binary intensity values of the 8 pixels that (approximately) lie on fixed distance from the cell center is taken.

The local cell layers approach has two advantages. The first imposes localization in the window observations due to cell partitioning and the second significantly reduces the observation dimensionality. For a sliding window of w pixels width, the local cell layers approach produces a binary observation of $$\left\lceil \frac{h}{w} \right\rceil \times \left( \frac{w-1}{2} \right) \times 8 \text{ bits.}$$

For wider windows, this reduction becomes significant. Table 8 compares the dimensionality of the observations produced by the local cell layers with that of the original window for 32-pixel height.

TABLE 7

The Observation dimensionality of the original System vs. the local cell layers approach

| Width | Original Dimensionality | Local cell layers Dimensionality | Reduction % |
|---|---|---|---|
| 3 | 96 | 88 | 8.33% |
| 5 | 160 | 112 | 30.00% |
| 7 | 224 | 120 | 46.43% |
| 9 | 288 | 128 | 55.56% |

Figure 11:
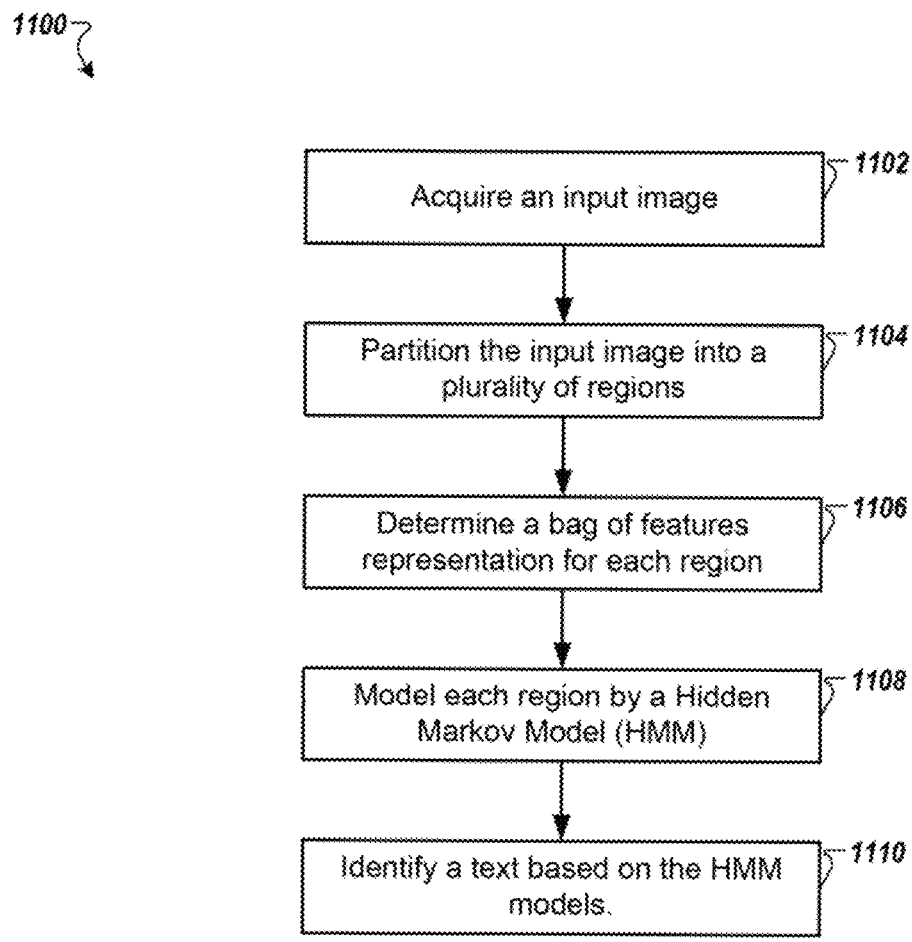
FIG. 11 is an exemplary flowchart of an Arabic handwriting recognition process according to one example.

FIG. 11 is an exemplary flowchart 1100 of an Arabic handwriting recognition process which is performed by the handwriting recognition system 102 according to one example. At step 1102, the recognition system 102 may acquire an input image representative of a handwritten Arabic text from a user via the network 112. At step 1104, the recognition system 102 may partition the input image into a plurality of regions.

At step 1106, for each region, the recognition system 102 may determine a bag of features representation for each region based on local descriptors as described previously herein. The recognition system 102 may also generate feature vectors based on the BoF. The BoF includes mid-level features which are more discriminative than low-level features that are extracted directly from the text images, e.g., percentile of intensities, angle, correlation, and energy.

At step 1108, the recognition system 102 may model using HMM each region. At step 110, the recognition system 102 may identify a text based on the HMM model. Further, the recognition system 102 may output the recognized text to other applications.

Although the flow chart shows specific orders of executing functional logic blocks, the order of executing the block blocks may be changed relative to the order shown, as will be understood by one of ordinary skill in the art. Also, two or more blocks shown in succession may be executed concurrently or with partial concurrence.

To assess the performance of the BHMM-based handwritten text recognition system on unconstrained Arabic handwritten text, extensive experimentations are conducted on the distinct handwritten lines of KHATT database. The line images are in gray-level format. The line slant and skew may be corrected using the procedures presented in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3), 1096-1112. To acquire binary observations, the lines are binarized using Otsu threshold method and normalized to a fixed height while preserving the aspect ratio. Then, they are flipped left-to-right for maintaining the writing style of Arabic.

The BHMM recognition system is defined, trained and evaluated according to the procedure described in Giménez, A., and Juan, A., 2009a, "Bernoulli HMMs at Subword Level for Handwritten Word Recognition," In Pattern Recognition and Image Analysis, e, 497-504, Springer Berlin Heidelber. The system includes as many BHMMs as the number of symbols in the dataset. The dataset in hand has 153 symbols corresponding to all character shapes, ligatures, digits and punctuation marks. Each BHMM has a fixed number of states with linear topology. The models states are first defined with a single Bernoulli mixture and then the number of mixtures are grownup as described later herein. The model parameters are initialized by uniformly segmenting the training set and applying the Viterbi initialization. The initialized models are trained by running 8 iterations of the Expectation-Maximization procedure using the entire training set. To create BHMM with K>1 Bernoulli mixtures, the mixtures of the trained models of K/2 mixtures are split. The created models are trained by running 4 Expectation-Maximization iterations on the entire training set. The trained system is evaluated on the validation set using the Viterbi algorithm. The configurations that achieved the best performance on the validation set are used in the final evaluation on the test set.

The transLectures-UPV toolkit described in Del-Agua, Adrià Giménez, M. A., Serrano, N., Andrés-Ferrer, J., Civera, J., Sanchis, A., and Juan, A., 2014, "The transLectures-UPV Toolkit," In Advances in Speech and Language Technologies for Iberian Languages, 269-78, Gran Canaria, Spain, is used as a tool for implementing the system. To report the performance, the obtained transcriptions are aligned with the ground truth transcriptions using the HRE-SULT command of the HTK toolkit described in Young, S., Evermann, G., Gales, M., Hain, T., Kershaw, D., Liu, X., Moore, G., 2006, The HTK Book (for HTK Version 3.4. Before the alignment, the different shapes of the same characters are merged and considered as a single class. The performance is reported at character recognition accuracy rate where the substitution, deletion and insertion errors are discounted.

A first set of experiments was conducted to evaluate the impact of the image height, the number of states per model and the number of the mixture components per state. Five values for the image height (24, 32, 40, 48, 64), four values for the number of states per model (4, 6, 8, 10) and six values for the number of Bernoulli mixtures per state (2, 4, 8, 16, 32, 64) are evaluated which resulted in 5×4×6=120 combinations. In all experiments, the window width is one pixel and therefore the observation dimensionality is as long as the image height. The character recognition accuracy rates achieved using these parameters are shown in Table 9.

The results showed that regardless of the observation dimensionality and the number of states, increasing the number of Bernoulli mixtures improves the character accuracy rate. This is attributed to the fact that the simple multivariate Bernoulli density can't model the dependency and correlation between the bits of binary images. Using large number of mixtures may help modeling them properly. Increasing the number of Bernoulli mixtures beyond 64 mixtures per state may improve the recognition accuracy. However, due to the computational overhead associated with using the large number of Bernoulli mixtures, the evaluation did not extend beyond 64 mixtures per state. The best number of states is proportional to the observation dimensionality, the higher dimensional observations require Bernoulli models with more states to model the large variations of the higher dimensional space. However, increasing the number of the states beyond the optimal value dropped down the recognition accuracy. The best character recognition accuracy rates were achieved using 32-D observations and 6-state models, though the accuracies achieved by fewer Bernoulli mixtures (less than 16 mixtures) are outperformed by the counterparts of the 24-D observations and 4-state models. The best character accuracy rate (44.92%) is achieved using 32-D observations and 6-state models with 64 Bernoulli mixtures per state. In the evaluations described herein, 32-pixel height images and 6-state BHMMs are used.

TABLE 9

The character recognition accuracy rates of the BHMM recognition system using different observation dimensionality, number of model states and number of mixtures per state

| # States | # Mixtures | | | | | |
|---|---|---|---|---|---|---|
| | 2 | 4 | 8 | 16 | 32 | 64 |
| (a) 24-D Observations | | | | | | |
| 4 | 35.89% | 38.14% | 40.39% | 42.05% | 43.53% | 44.35% |
| 6 | 34.58% | 36.32% | 38.99% | 40.60% | 41.75% | 42.56% |
| 8 | 30.13% | 31.75% | 33.96% | 34.69% | 35.34% | 35.20% |
| 10 | 24.57% | 25.73% | 27.31% | 28.45% | 29.67% | 29.61% |
| (b) 32-D Observations | | | | | | |
| 4 | 33.95% | 36.08% | 38.23% | 40.35% | 42.03% | 43.29% |
| 6 | 35.33% | 37.52% | 40.06% | 42.32% | 43.92% | 44.92% |
| 8 | 33.49% | 35.18% | 38.15% | 40.19% | 41.79% | 42.64% |
| 10 | 29.94% | 31.49% | 34.09% | 35.65% | 36.41% | 36.85% |
| (c) 40-D Observations | | | | | | |
| 4 | 30.31% | 32.65% | 34.89% | 36.77% | 39.18% | 40.65% |
| 6 | 34.16% | 36.62% | 39.46% | 41.48% | 43.28% | 44.59% |
| 8 | 34.37% | 36.21% | 39.04% | 41.25% | 43.13% | 44.15% |
| 10 | 32.14% | 34.24% | 36.84% | 39.22% | 40.91% | 41.90% |
| (d) 48-D Observations | | | | | | |
| 4 | 26.14% | 28.77% | 31.00% | 33.37% | 35.69% | 37.35% |
| 6 | 32.58% | 35.22% | 37.75% | 39.86% | 41.74% | 43.14% |
| 8 | 33.98% | 36.58% | 38.97% | 41.11% | 43.14% | 44.27% |
| 10 | 33.32% | 35.19% | 38.24% | 40.53% | 42.42% | 43.06% |
| (e) 64-D Observations | | | | | | |
| 4 | 16.62% | 19.15% | 22.55% | 25.39% | 27.91% | 29.69% |
| 6 | 27.75% | 30.38% | 32.52% | 35.18% | 37.04% | 38.50% |
| 8 | 31.54% | 34.51% | 36.73% | 39.33% | 41.41% | 42.43% |
| 10 | 33.02% | 35.76% | 38.15% | 40.68% | 42.66% | 43.82% |

The second set of experiments is conducted to evaluate the sliding window and the sliding window repositioning techniques. Four values for the sliding window width (3, 5, 7 and 9 pixels) with a stride of one pixel in all cases are used. The sliding window technique produces observations of h×w bits. The character recognition accuracy rates for the different window widths are shown in Table 10. Comparing the results to the results of Table 9, the character recognition rate has significantly improved with wider windows. The 9-pixel width window added 8.51% to the character recognition rate. The performance of applying the repositioning strategy on the sliding window of 9-pixel width is also shown in Table 10 with the asterisk (*). The strategy achieved character recognition rate of 59.44% which outperforms the baseline system by 14.52%.

The recognition accuracy of HMMs-based systems could be enhanced by balancing the contribution of the language model and controlling the word insertion penalty as described in Young, S., Evermann, G., Gales, M., Hain, T., Kershaw, D., Liu, X., Moore, G., 2006, The HTK Book (for HTK Version 3.4). This is achieved by tuning the grammar-scale-factor and word-insertion-penalty parameters of the Viterbi implementation. After tuning the two parameters, the character recognition rate on the validation set increased to 63.41%.

Using the best configurations (32-pixel image height, 9-pixel window with reposition, 6-state BHMMs with 64 Bernoulli mixtures, grammar-scale-factor of 10 and word-insertion-penalty of 9), the recognition system achieved character recognition rate of 63.28% on the test set. This achievement is promising in such challenging dataset of unconstrained handwritten text. As a comparison with other methods, the best character recognition accuracy rate reported in Mahmoud, S., Ahmad, I., Al-Khatib, W., Alshayeb, M., Parvez, M., Märgner, V., and Fink, G., 2014, "KHATT: An Open Arabic Offline Handwritten Text Database," Pattern Recognition 47 (3), 1096-1112, using the same dataset was 46.13%, using traditional statistical features and discrete HMMs.

TABLE 10

Character recognition rates using the sliding window and sliding
window repositioning techniques. (Window width with *
indicates the sliding window repositioning is applied)

| Window Width | # Mixtures | | | | | |
|---|---|---|---|---|---|---|
| | 2 | 4 | 8 | 16 | 32 | 64 |
| 3 | 33.38% | 36.48% | 40.44% | 43.95% | 47.04% | 49.07% |
| 5 | 34.15% | 38.14% | 42.25% | 46.66% | 49.69% | 51.70% |
| 7 | 35.13% | 39.65% | 44.58% | 48.74% | 51.28% | 53.00% |
| 9 | 35.33% | 39.96% | 45.03% | 49.26% | 51.23% | 53.43% |
| 9* | 45.27% | 49.66% | 53.60% | 56.67% | 58.60% | 59.44% |

The local sampling approach was evaluated on the four values of the sliding window width that are described previously herein, (i.e., 3, 5, 7 and 9 pixels). The sliding window repositioning technique was applied to the 9-pixel width window. The results are shown in Table 11. The recognition rates of the local sampling approach are very close to that shown in Table 10 despite that the observations are of lower dimensionality. By adjusting the grammar-scale-factor and word-insertion-penalty parameters, the 9-pixel width window with repositioning achieved 63.36% character accuracy on the validation set. Using the best configurations (32-pixel image height, 9-pixel window with reposition, 6-state BHMMs with 64 Bernoulli mixtures, grammar-scale-factor of 9 and word-insertion-penalty of 12), the local sampling approach achieved 63.34% character accuracy on the test set which is slightly better than that of the original (non-sampled) window.

TABLE 11

Character recognition rates of the local sampling approach
(Window width with * indicates the repositioning is applied)

| Window Width | # Mixtures | | | | | |
|---|---|---|---|---|---|---|
| | 2 | 4 | 8 | 16 | 32 | 64 |
| 3 | 33.77% | 36.50% | 40.20% | 43.68% | 46.56% | 48.08% |
| 5 | 33.98% | 37.48% | 41.63% | 45.64% | 48.85% | 50.90% |
| 7 | 34.35% | 38.41% | 43.47% | 47.61% | 50.75% | 52.34% |
| 9 | 34.66% | 39.51% | 44.19% | 48.38% | 51.37% | 53.28% |
| 9* | 44.72% | 49.28% | 53.03% | 56.15% | 58.27% | 59.03% |

Similarly, the local cell layers approach was evaluated on the same four window sizes and the repositioning technique was applied to the 9-pixel width window. The character recognition accuracies are shown in Table 12. Comparing these results with the results in Table 10, the local cell layers improved the character recognition accuracy rates of small width windows (3- and 5-pixels windows). However, the wider windows achieved lower performance. This is attributed to the large reduction in the observation dimensionality of the wide windows. By adjusting the grammar-scale-factor and word-insertion-penalty parameters, the 9-pixel width window with repositioning achieved 61.92% character recognition accuracy on the validation set using models of 64 mixtures per state. Using the best configurations (32-pixel image height, 9-pixel window with reposition, 6-state BHMMs with 64 Bernoulli mixtures, grammar-scale-factor of 6 and word-insertion-penalty of 6), the local sampling approach character achieved accuracy rate of 61.56% on the test set, which is an improvement given that the observation dimensionality is less than half

TABLE 12

Character recognition rates using the local cell layers approach
(Window width with * indicates the repositioning is applied)

| Window Width | # Mixtures | | | | | |
|---|---|---|---|---|---|---|
| | 2 | 4 | 8 | 16 | 32 | 64 |
| 3 | 33.57% | 36.56% | 40.76% | 44.42% | 47.95% | 49.84% |
| 5 | 34.65% | 38.62% | 43.03% | 47.02% | 49.90% | 52.02% |
| 7 | 35.08% | 39.55% | 44.29% | 48.14% | 50.81% | 52.51% |
| 9 | 34.62% | 38.67% | 43.33% | 47.34% | 50.23% | 51.91% |
| 9* | 42.91% | 46.81% | 50.88% | 53.98% | 56.29% | 57.49% |

Besides the recognition accuracy, the two approaches described herein are computationally fast due to lower dimensionality of the observation. Table 13 shows the execution time of a single iteration of the Expectation-Maximization algorithm and in the evaluation on the validation set for the original system and the two proposed approaches. The low-dimensional observations dramatically speedup the training and evaluation implementations. For instance, the local cell layers approach gained 2.11× execution speedup than the original system in training and 1.79× in evaluation.

TABLE 13

Execution time (in hours) of a single iteration of training and
in evaluation on the validation set by the three approaches

| | Window Repositioning | Local Sampling | Local Cell Layers |
|---|---|---|---|
| Training | 5.4425 | 4.0694 | 2.5778 |
| Evaluation | 1.3081 | 1.0492 | 0.7303 |

Figure 12:
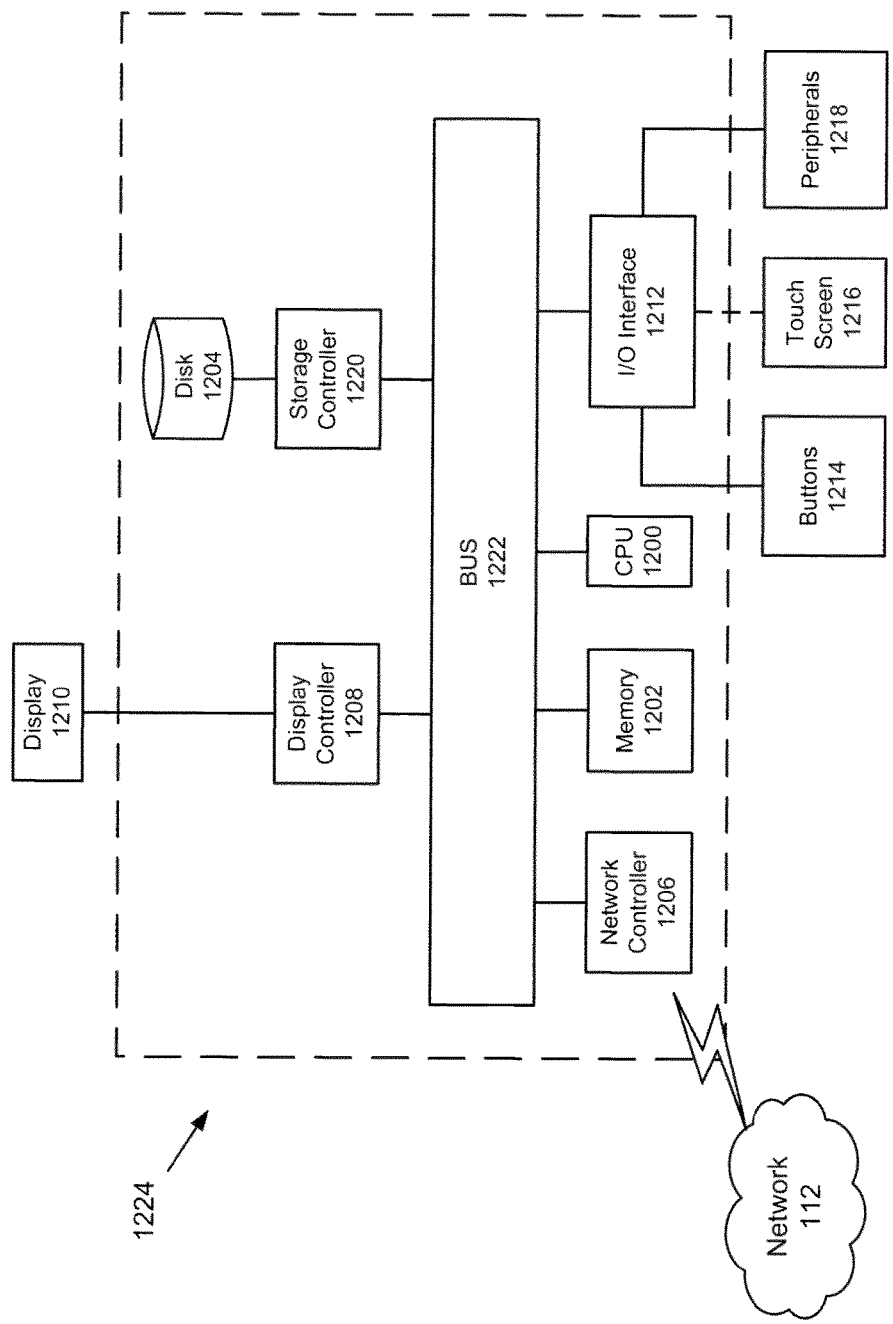
FIG. 12 is a block diagram of a computer according to one example.

Next, a hardware description of the computer 1224 that can be configured to perform functions of any one or a combination of the preprocessing module 104, the extraction module 106, and the recognition module 108 according to exemplary embodiments is described with reference to FIG. 12. In FIG. 12, the computer 1224 includes a CPU 1200 which performs the processes described herein. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1224 communicates, such as a server or computer.

Further, the claimed advancements may be provided as a utility application, background daemon, or component of an operating system, or combination thereof, executing in conjunction with CPU 1200 and an operating system such as Microsoft® Windows®, UNIX®, Oracle® Solaris, LINUX®, Apple macOS® and other systems known to those skilled in the art.

In order to achieve the computer 1224, the hardware elements may be realized by various circuitry elements, known to those skilled in the art. For example, CPU 1200 may be a Xenon® or Core® processor from Intel Corporation of America or an Opteron® processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The computer 1224 in FIG. 9 also includes a network controller 1206, such as an Intel Ethernet PRO network interface card from Intel Corporation of America, for interfacing with network 112. As can be appreciated, the network 112 can be a public network, such as the Internet, or a private network such as LAN or WAN network, or any combination thereof and can also include PSTN or ISDN sub-networks. The network 112 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1224 further includes a display controller 1208, such as a NVIDIA® GeForce® GTX or Quadro® graphics adaptor from NVIDIA Corporation of America for interfacing with display 1210, such as a Hewlett Packard® HPL2445w LCD monitor. A general purpose I/O interface 1212 interfaces with a keyboard and/or mouse 1214 as well as an optional touch screen panel 1216 on or separate from display 1210. General purpose I/O interface also connects to a variety of peripherals 1218 including printers and scanners, such as an OfficeJet® or DeskJet® from Hewlett Packard®.

The general purpose storage controller 1220 connects the storage medium disk 1204 with communication bus 1222, which may be an ISA, EISA, VESA, PCI, or similar, for interconnecting all of the components of the computer 1224. A description of the general features and functionality of the display 1210, keyboard and/or mouse 1214, as well as the display controller 1208, storage controller 1220, network controller 1206, and general purpose I/O interface 1212 is omitted herein for brevity as these features are known.

The features of the present disclosure provide a multitude of improvements in the technical field of handwriting recognition. The computational performance of gradient-magnitude-and-orientation descriptors is improved. In addition, the descriptor dimensionality is reduced thus minimizing computation. Thus, the present disclosure improves the functioning of the server by increasing processing speed. In addition, the BoF representations are improved by applying the multi-stream discrete HMMs.

Accordingly, the advancements described herein provide for the creation of an improved handwriting processing system that enhance the way the text images are processed, stored, and retrieved, thereby providing faster processing of data and enabling faster and more accurate handwriting recognition than is possible with traditional handwriting processing system. Thus, the systems and methods described herein are directed to a novel implementation implemented via special purpose computing rather than mere generic features implemented on a general-purpose computer.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for Arabic handwriting recognition, the method comprising:
    acquiring, an input image representative of a handwritten Arabic text from a user;
    partitioning, using processing circuitry of a server, the input image into a plurality of regions;
    determining, using the processing circuitry, a bag of features representation for each region of the plurality of regions, wherein the bag of features representation includes one or more mid-level features selected from the group consisting of a percentile of intensities, an angle, a correlation, and an energy;
    modeling, using the processing circuitry, each region independently by multi stream discrete Hidden Markov Model (HMM); and
    identifying, using processing circuitry, a recognized text based on the HMM models.

2. The method of claim 1, further comprising:
    updating one or more fields based on the recognized text.

3. The method of claim 1, further comprising:
    determining a gradient magnitude and orientation by referencing a lookup table stored in a memory of the server.

4. The method of claim 3, wherein symmetric orientation bins are combined into a single bin.

5. The method of claim 4, wherein the gradient orientation is quantized into four orientation bins.

6. The method of claim 1, further comprising:
    smoothing the input image by a Gaussian Kernel proportional to a descriptor spatial area.

7. The method of claim 1, wherein the plurality of regions includes a middle region, an upper region, and a lower region.

8. The method of claim 7, wherein the middle region includes a writing baseline.

9. The method of claim 1, further comprising:
    applying a sliding window for each of the plurality of regions;
    partitioning each window of the sliding window into one or more cells; and
    determining one or more local descriptors for each cell.

10. The method of claim 9, wherein a center associated with the one or more local descriptors matches a center of each window.

* * * * *